United States Patent [19]

Poole et al.

[11] Patent Number: 4,945,003
[45] Date of Patent: Jul. 31, 1990

[54] UV COATINGS CONTAINING CHLORINATED POLYOLEFINS, METHOD OF CURING, AND COATED SUBSTRATES THEREFROM

[75] Inventors: James E. Poole, Gibsonia; Marvis E. Hartman, Pittsburgh, both of Pa.

[73] Assignee: PPG Industries, Inc., Pittsburgh, Pa.

[21] Appl. No.: 374,799

[22] Filed: Jul. 3, 1989

Related U.S. Application Data

[62] Division of Ser. No. 168,069, Mar. 14, 1988, Pat. No. 4,880,849.

[51] Int. Cl.$^5$ ............... B32B 15/08; B32B 27/08; B32B 27/32
[52] U.S. Cl. ............... 428/462; 428/461
[58] Field of Search ............... 522/10, 14; 525/193; 428/462, 461

[56] References Cited

U.S. PATENT DOCUMENTS

| | | | |
|---|---|---|---|
| 4,134,814 | 1/1979 | De Poortere et al. | 522/10 |
| 4,197,132 | 4/1980 | Yazawa et al. | 430/306 |
| 4,305,981 | 12/1981 | Muroi et al. | 428/462 |
| 4,478,897 | 10/1984 | Akashi et al. | 428/462 |
| 4,632,897 | 12/1986 | Barzinski et al. | 522/10 |

*Primary Examiner*—John C. Bleutge
*Assistant Examiner*—Susan Berman

*Attorney, Agent, or Firm*—Thomas M. Breininger

[57] ABSTRACT

Disclosed is a coating composition which crosslinks upon exposure to ultraviolet radiation. The coating composition comprises: (A) from 1 to 5 percent of a saturated, chlorinated polymeric material selected from the group consisting of (1) a chlorinated polyolefin containing about 5 to 75 percent by weight of chlorine and having a number average molecular weight of about 5,000–50,000, (2) a chlorinated polyolefin containing carboxylic anhydride groups and about 5 to 25 percent by weight of chlorine and having a number average molecular weight of about 5,000–50,000, and (3) a mixture thereof; (B) from 20 to 80 percent of a radiation sensitive monomer having at least two addition polymerizable unsaturated bonds; (C) from 0.1 to 5.0 percent of a photopolymerization initiator; and (D) from 80 to 20 percent of an acrylic addition polymer having at least one amino group and having a number average molecular weight of about 8,000–70,000.

Also disclosed is a method of coating comprising: (I) applying to a plastic substrate a film of coating composition of the invention; and (II) curing the film by exposing the film to ultraviolet radiation.

Also disclosed is a plastic article having directly adhered to a surface thereof, a crosslinked film produced by the method of the invention.

7 Claims, No Drawings

UV COATINGS CONTAINING CHLORINATED POLYOLEFINS, METHOD OF CURING, AND COATED SUBSTRATES THEREFROM this is a divisional of application Ser. No. 07/168,069, filed Mar. 14, 1988, now U.S. Pat. No. 4,880,849 issued Nov. 4, 1989.

BACKGROUND OF THE INVENTION

This invention is directed to ultraviolet light (UV) curable coating compositions containing chlorinated polyolefins. The compositions are particularly useful as coatings for a variety of plastic substrates (both thermoplastic and thermoset), especially as basecoats for providing a glass-like smooth surface to the plastic to which a thin film of metal can be subsequently deposited via, for example, vacuum deposition or sputtering.

It is known to apply a thin film of metal to a nonmetallic substrate to make a metallized substrate and to provide the metallized substrate with a protective coating. Such coated, metallized substrates are useful, for example, for such diverse articles as nonmetallic parts on automotive vehicles, and containers and container caps for cosmetics. The plastic substrates for such articles often are composed of heat sensitive materials such as heat sensitive plastics which can distort when exposed to elevated temperatures. The plastic substrate itself typically contains many surface irregularities which prevents attainment of a good mirror finish if the thin layer of metal is deposited directly thereon.

Accordingly, a basecoat of an organic coating composition generally is first used to coat the plastic substrate, and the thin layer of metal is subsequently deposited over the basecoat. However, often adequate adhesion between the plastic substrate and the basecoat can not be achieved. One proposed method of solving this adhesion problem with respect to polyolefin substrates, as described in U.S. Pat. No. 4,303,697, is to treat the surface of the polyolefin substrate with a solution of a chlorinated polyolefin material in a solvent, allow the solvent to evaporate optionally at an elevated temperature, and then expose the resulting dry surface to ultraviolat radiation. In this art known method, the treated surface of the polyolefin substrate is then subsequently painted with the coating composition to be adhered. However, this process has the disadvantages of requiring the steps of applying the solvent solution of chlorinated polyolefin to the polyolefin substrate, allowing the solvent to evaporate, and then exposing the dry surface to ultraviolet radiation before the paint to be adhered is even applied.

It would be desirable to be able to apply organic coating compositions directly to a variety of plastic substrates without having to carry out steps such as those described in U.S. Patent No. 4,303,697 (summarized above) for treating polyolefin substrates, and still achieve excellent adhesion of the organic coatings directly to the plastic substrates under a variety of conditions. Moreover, it would be desirable to provide coatings for a variety of plastic substrates which can be cured efficiently, which provide excellent adhesion to the underlying plastic substrate, and which can provide a glass smooth surface for subsequent metallization. These and other objects will become apparent to one skilled in the art from the disclosure contained herein.

SUMMARY OF THE INVENTION

The present invention is for a coating composition which crosslinks upon exposure to ultraviolet radiation. The coating composition comprises, and typically consists essentially of: (A) from 1 to 5 percent of a saturated, chlorinated polymeric material selected from the group consisting of (1) a chlorinated polyolefin containing about 5 to 75 percent by weight of chlorine and having a number average molecular weight of about 5,000–50,000, (2) a chlorinated polyolefin containing carboxylic anhydride groups and about 5 to 25 percent by weight of chlorine and having a number average molecular weight of about 5,000–50,000, and (3) a mixture thereof; (B) from 20 to 80 percent of a radiation sensitive monomer having at least two addition polymerizable unsaturated bonds; (C) from 0.1 to 5.0 percent of a photopolymerization initiator; and (D) from 80 to 20 percent of an acrylic addition polymer having at least one amino group and having a number average molecular weight of about 8,000–70,000. The addition polymer is derived from a mixture of copolymerizable ethylenically unsaturated monomers containing a monomeric ethylenically unsaturated amine. The percentages of components (A), (B), (C) and (D) are by weight based on nonvolatile components (i.e., solids) of the coating composition.

The invention also is for a method of coating comprising: (I) applying to a plastic substrate a film of coating composition of the invention; and (II) curing the film by exposing the film to ultraviolet radiation. The method preferably, additionally comprises a step (III) of applying an adherent, thin layer of metal to the film after the coating composition is exposed to ultraviolet radiation. Further, the method preferably, additionally comprises a step (IV) of applying to the thin layer of metal a film of clear topcoating composition which crosslinks upon exposure to ultraviolet radiation, followed by a step (V) of curing the film of topcoating composition by exposing it to ultraviolet radiation.

The invention also is for a plastic article having directly adhered to a surface thereof, a crosslinked film produced by the method of the invention.

DETAILED DESCRIPTION OF THE INVENTION

A coating composition of the invention crosslinks upon exposure to ultraviolet radiation. The composition contains, as component (A), from 1 to 5 percent of a saturated, chlorinated polymeric material selected from the group consisting of (1) a chlorinated polyolefin containing about 5 to 75 percent by weight of chlorine and having a number average molecular weight of about 5,000–50,000, (2) a chlorinated polyolefin containing carboxylic anhydride groups and about 5 to 25 percent by weight of chlorine and having a number average molecular weight of about 5,000–50,000, and (3) a mixture thereof. The percentage of component (A), as well as the percentages of components (B), (C) and (D), is by weight based on the nonvolatile components of the coating composition. The nonvolatile components are often referred to as "solids".

Chlorinated polymeric materials suitable for a composition of the invention are known in the art. For example, chlorinated polypropylene can be readily prepared by solution, melt, or solid polymer chlorination at moderate to high temperatures according to well-known techniques as reviewed, for example, in Raff and Doak, "Crystalline Olefin Polymers II," p. 239, Interscience Publishers, New York, N.Y., 1964. Chlorinated polypropylene containing carboxylic anhydride groups can be prepared by grafting maleic anhydride on polypropylene and chlorinating the graft copolymer, according to the teachings of U.S. Pat. No. 3,579,485 to Folzenlogen et al (assigned to Eastman Kodak Company), which are herein incorporated by reference. As indicated in this patent, conventional high molecular weight polypropylene is first degraded under controlled conditions to a material having a melt viscosity range of about 100–5,000 cps at 190° C and an inherent viscosity of about 0.1 to 0.5 measured in tetralin at 145° C. Grafting of maleic anhydride takes place at about 150° C–300° C, preferably in the presence of a free radical generator. Chlorination of the graft copolymer can be carried out, for example, as shown in Example 9 of the above-mentioned U.S. Pat. No. 3,579,485. Chlorinated polymeric materials suitable for the composition and method of the present invention are available commercially from Eastman Chemical Products, Rochester, N.Y.

A composition of the invention contains, as component (B), from 20 to 80 percent, preferably from 50 to 70 percent, by weight based on solids, of a radiation sensitive monomer having at least two addition polymerizable unsaturated bonds. Examples of such radiation sensitive monomers include ethylenically unsaturated acrylic or methacrylic esters such as ethylene glycol di(meth)acrylate, diethylene glycol di(meth)acrylate, tetraethylene glycol di(meth)acrylate, glycerol di(meth)acrylate, glycerol tri(meth)acrylate, 1,3-propylene glycol di(meth)acrylate, 1,2,4-butanetriol tri(meth)acrylate, 1,4-cyclohexanediol di(meth)acrylate, 1,4-benzenediol di(meth)acrylate, pentaerythritol tetra(meth)acrylate, 1,5-pentanediol di(meth)acrylate, trimethylolpropane tri(meth)acrylate; acrylic or methacrylic amides such as N,N-bis(beta- hydroxyethyl) (meth)acrylamide, methylene bis(meth)acrylamide, 1,6-hexamethylene bis(meth)acrylamide, diethylenetriamine tris(meth)acrylamide, bis(gamma-(meth)acrylaa:idepropoxy)ethane and beta-(meth)acrylamide ethylacrylate; and vinyl monomers such as divinyl benzene. Of the aforesaid radiation sensitive monomers, the (meth)acrylic esters of organic polyols are preferred, pentaerythritol triacrylate and hexanediol diacrylate being particularly preferred. Wherever used herein "(meth)acrylate" is intended to refer to the respective compound having acrylate functionality and/or the respective compound having methacrylate functionality.

Although not preferred, it should be understood that a composition of the invention may include one or more radiation sensitive monoethylenically unsaturated monomers examples of which include: mono (meth)acrylates such as methyl (meth)acrylate, ethyl (meth)acrylate, isopropyl (meth)acrylate, n-butyl (meth)acrylate, isobutyl (meth)acrylate, 2-ethylhexyl (meth)acrylate, 2-hydroxyethyl (meth)acrylate, isobornyl (meth)acrylate and tetrahydrofurfuryl (meth)acrylate; mono (meth)acrylic amides such as (meth)acrylamide, N(beta-hydroxyethyl) (meth)acrylamide, and vinyl monomers such as vinyl acetate, styrene and vinyl toluene.

Ultraviolet radiation (UV) generally is used to cure a composition of the invention. Any suitable source which emits ultraviolet light having a wavelength ranging from about 180 to about 400 nanometers may be employed. Suitable sources of ultraviolet light are generally known and include, for example, mercury arcs, carbon arcs, low pressure mercury lamps, medium pressure mercury lamps, high pressure mercury lamps, swirl- flow plasma arcs and ultraviolet light emitting diodes. Preferred are ultraviolet light emitting lamps of the medium pressure mercury vapor type. Such lamps usually have fused quartz envelopes and are ordinarily in the form of long tubes having an electrode at both ends. Typically, preferred medium pressure mercury lamps usually employed to cure a composition of the invention have outputs of about 200 watts per inch across the length of the tube.

Since UV light generally is used to cure a composition of the invention, the composition generally contains, as component (C), from 0.1 to 5.0 percent, based on solids, of a photopolymerization initiator (and/or photopolymerization sensitizer). Photoinitiators and photosensitizers are generally known in the art. Examples of photoinitiators include isobutyl benzoin ether, mixtures of butyl isomers of butyl benzoin ether, alpha,alpha-diethoxyacetophenone, and alpha,alpha-dimethoxy-alpha- phenylacetophenone. Examples of photosensitizers include benzophenone, anthraquinone, and thioxanthone. Other examples of photoinitiators and photosensitizers can be found in U.S. Pat. No. 4,017,652.

A composition of the invention contains, as component (D), from 80 to 20 percent, preferably from 30 to 50 percent by weight, based on solids, of an acrylic addition polymer having at least one amino group and having a number average molecular weight of about 8,000–70,000, preferably of about 10,000–50,000, as determined by gel permeation chromatography utilizing a polystyrene standard. The addition polymer is derived from a mixture of copolymerizable ethylenically unsaturated monomers containing a monomeric ethylenically unsaturated amine, preferably one selected from the group consisting of an acrylate-functional amine, a methacrylate-functional amine and a mixture thereof The amount of monomeric ethylenically unsaturated amine in the mixture of copolymerizable ethylenically unsaturated monomers generally ranges from 1 to 25 percent by weight, preferably from 2 to 10 percent by weight, based on the total weight of monomers employed in the mixture. Examples of monomeric ethylenically unsaturated amines which may be employed include: (2-diethylamino)ethyl acrylate, (2-diethylamino)ethyl methacrylate, (2-dimethylamino)ethyl acrylate, (2-dimethylamino)ethyl methacrylate, N-t-butylaminoethyl methacrylate, (2-dipropylamino)ethyl acrylate, (2-dipropylamino)ethyl methacrylate, (2-dibutylamino)ethyl acrylate, (2-dibutylamino)ethyl methacrylate, [2-(di-2-hydroxypropyl)]ethyl acrylate, and [2-(di-2-hydroxypropyl)]ethyl methacrylate.

The mixture of copolymerizable ethylenically unsaturated monomers for preparing the aforesaid addition polymer generally additionally contains one or more other copolymerizable ethylenically unsaturated monomers, examples of which include: acrylic and methacrylic acids and their ester derivatives such as the alkyl acrylates and the alkyl methacrylates including, for example, methyl acrylate, ethyl acrylate, butyl acrylate, propyl acrylate, 2-ethylhexyl acrylate, methyl methacrylate, butyl methacrylate, 2-ethylhexyl methacrylate, decyl methacrylate, lauryl methacrylate, hydroxyethyl acrylate, hydroxypropyl acrylate, hydroxyethyl methacrylate, and hydroxypropyl methacrylate; isobornyl methacrylate and isobornyl acrylate; unsaturated amides such as acrylamide and methacrylamide; unsaturated nitriles such as acrylonitrile, methacrylonitrile and ethacrylonitrile; vinyl aromatic hydrocarbons such as styrene, alpha-methyl styrene, and vinyl toluene; vinyl acetate; vinyl chloride; and unsaturated epoxy-functional monomers such as glycidyl acrylate and glycidyl methacrylate.

The addition polymer typically is prepared by free radical addition polymerization of the mixture of ethylenically unsaturated monomers in the presence of a vinyl polymerization initiator. Examples of suitable initiators include azo compounds such as alpha alpha'-azobis(isobutyronitrile); peroxides such as benzoyl peroxide and cumens hydroperoxide; tertiary butyl peracetate; isopropyl percarbonate and butyl isopropyl peroxy carbonate; and similar compounds. The quantity of initiator employed can be varied considerably. However, in most instances, it is desirable to utilize from about 0.1 to about 10 percent by weight based on the total weight of monomers employed. If desired, a chain modifying agent or chain transfer agent can be added to the polymerization mixture. The mercaptans, such as dodecyl mercaptan, tertiary dodecyl mercaptan, octyl mercaptan, hexyl mercaptan, cyclopentadiene, allyl acetate, allyl carbamate and mercaptoethanol may be used for this purpose. The polymerization reaction typically is carried out in an organic solvent medium utilizing conventional solution polymerization procedures which are well known in the addition polymer art as illustrated with particularity in, for example, U.S. Pat. Nos. 2,978,437; 3,079,434 and 3,307,963. Organic solvents which may be utilized in the polymerization of the monomers include virtually any of the organic solvents heretofore employed in preparing conventional acrylic or vinyl polymers such as, for example, alcohols, esters, ketones, aromatic hydrocarbons or mixtures thereof.

Where desired, a composition of the invention may contain an organic solvent and/or diluent. Organic solvents which may be utilized include any of the organic solvents heretofore employed in ultraviolet light curable coating compositions which are compatible with components (A), (B), (C) and (D) of the composition of the invention. Examples of organic solvents include: esters such as n-butyl acetate, ethyl acetate and isobutyl acetate; ether alcohols such as ethylene glycol monoethyl ether, ethylene glycol monobutyl ether, propylene glycol monomethyl ether, dipropylene glycol monoethyl ether, propylene glycol monoethylether acetate, ethylene glycol monoethylether acetate, dipropylene glycol monoethylether acetate and diethylene glycol monoethylether acetate; ketones such as methyl ethyl ketone, methyl n-butyl ketone and methyl isobutyl ketone; lower alkanols containing 2 to 4 carbon atoms including ethanol, propanol, isopropanol and butanol; and aromatic hydrocarbons such as xylene, toluene and naphtha.

It has been found that coating compositions of the invention can be UV cured to provide crosslinked films which exhibit surprisingly outstanding adhesion properties over a wide variety of thermoplastic and/or thermoset plastics examples of which include: acrylonitrile-butadiene-styrene copolymers (ABS plastics), polyethylenes, polypropylenes and copolymers of ethylene and propylene, polycarbonates, polyesters and "glass-filled" polyesters (BMC, SMC), polyamides such as mineral filled nylons polyarylates, acrylics, polystyrenes, and the like. Moreover, the adhesion of films from compositions of the invention when applied to plastic substrates according to the method of the invention is excellent under a variety of otherwise destructive conditions such as prolonged exposure to hot water and to 100 percent relative humidity.

Coating compositions of the invention may be applied to a substrate by any known means, for example, spraying, curtain coating, dipping, roll coating, brushing, doctor blade coating, etc. They may be preliminarily flashed or dried at ambient or elevated temperature to reduce or remove solvent if desired and then cured by ultraviolet radiation. Cure time will vary depending upon the particular formulation, the intensity of UV radiation employed, the amount of composition applied to the substrate and so forth. Given the disclosure herein, variation of these parameters would be within the level of ordinary skill in the art.

Cured films from compositions of the invention applied to plastic substrates serve as excellent basecoats for under thin films of metal, such as aluminum, nickel, copper, chromium, chromium alloys, etc., which can be deposited on the basecoat by any of the generally known techniques of vacuum metallizing such as evaporation, sputtering, electroless deposition, and electroplating. Preferred techniques include evaporation and sputtering, especially evaporation. As used herein the phrase, "thin film(s) of metal" is intended to include metal films having a thickness of from 0.2 millimicrons (0.2 nanometers, 2 angstroms) to 5,000 millimicrons (5,000 nanometers, 50,000 angstroms).

The method of the invention comprises: (I) applying to a plastic substrate a film of coating composition of the invention; and (II) curing the film by exposing the film to ultraviolet radiation. The method preferably, additionally comprises a step (III) of applying an adherent, thin layer of metal over the UV cured film from the coating composition of the invention. Further, the method preferably, additionally comprises a step (IV) of applying to the thin layer of metal a film of clear topcoating composition which crosslinks upon exposure to ultraviolet radiation, followed by a step (V) of curing the film of topcoating composition by exposing it to ultraviolet radiation.

The examples which follow are submitted for the purpose of further illustrating the nature of the invention and should not be construed as a limitation on the scope thereof.

As used in the body of the specification, examples, and claims, all percents, ratios and parts are by weight unless otherwise specifically indicated. Wherever used herein, "pbw" means "parts by weight".

EXAMPLE 1

This example illustrates the preparation of a coating composition of the invention, the application and curing of the coating composition on various plastic substrates, and adhesion properties of the cured coatings under various conditions.

(a) A clear, ultraviolet light (UV) curable coating composition is prepared by premixing the first two ingredients set forth in the following TABLE 1 and thereafter adding in order with stirring the remaining ingredients. The resulting UV curable composition contains 40 percent by weight solids and 60 percent by weight solvents.

TABLE 1

| Component | Amount (pbw) |
|---|---|
| n-Butyl acetate | 299.4 |

TABLE 1-continued

| Component | Amount (pbw) |
|---|---|
| Chlorinated polyolefin[1] | 26.2 |
| Acrylic copolymer[2] | 320.3 |
| 2,2-Diethoxyacetophenone | 9.2 |
| Benzophenone | 9.8 |
| Alpha-hydroxy-alpha-dimethylphenyl ketone[3] | 6.6 |
| 1,6-Hexanediol diacrylate | 59.0 |
| Ethoxylated trimethylol propane triacrylate[4] | 88.4 |

[1] A mixture of about 25 percent by weight chlorinated polyolefin in about 75 percent by weight xylene having a boiling point of 140° C. available as Eastman ® CP-343-3 from Eastman chemical Products, Inc.
[2] An acrylic copolymer prepared from 87.4 pbw isobornyl acrylate, 49.9 pbw methyl methacrylate, 25.0 pbw 2-ethylhexyl acrylate, 12.5 pbw dimethylaminoethyl methacrylate and 74.9 pbw butyl methacrylate at 46 percent by weight solids in a solvent mixture containing 25.0 pbw ethyl acetate and 225.0 pbw butyl acetate. The acrylic copolymer was prepared using 1 pbw 2,2'-azobismethylethylacetonitrile (VAZO 67 from E. I. DuPont de Nemours and Company) and 0.5 pbw hypophosphorous acid. The product has a Gardner-Holdt viscosity of T-U, residual contents of methyl methacrylate, 2-ethylhexyl acrylate and isobornyl acrylate determined by gas chromatography of 0.10, 0.61 and 2.1 percent by weight respectively, a number average molecular weight in the range of about 30,746-39,763, a weight average molecular weight in the range of about 75,000-82,638, and a peak molecular weight in the range of about 124,452-137,005 as determined by gel permeation chromatography utilizing a polystyrene standard.
[3] A photoinitiator available as EM1173 from EM Chemicals.
[4] Available as SR-454 from Sartomer Company and having a molecular weight of 428 and a specific gravity of 25° C. of 1.1101.

(b) The coating composition of part (a) immediately above is applied to at least 10 samples of each of the 15 substrates as set forth in the following TABLE 2.

All "flat stock" samples are coated as follows. The UV coating composition is spray applied to the sample followed by a 5 minute flash at ambient temperature and a 3 minute flash at 150° F (65.6° C) and then cured by twice passing the sample at a rate of 40 ft/min beneath 4 medium pressure mercury vapor lamps each operating at 200 watts/inch at a distance of about 8 inches from the surface of the sample to provide a total exposure to the surface of the coating of about 2500-3500 millijoules/cm² per sample. The resultant cured films have a dry film thickness ranging from 0.5 to 1.5 mils.

At least 10 samples of all "curved pieces" are coated and cured in the manner described immediately above for "flat stock" to provide clear dry films of from 0.5-1.5 mils thickness.

At least 10 additional samples of all "curved pieces" are flowcoated with the UV coating composition, flashed for 10-15 minutes at ambient temperature, and then UV cured by rotating the sample for 90 seconds at 4 revolutions/minute at a distance of 14 inches from 2 Fusion bulbs (H bulbs) each operating at 200 watts/inch. The resultant cured films have a dry film thickness of from 1.0-2.0 mils.

TABLE 2

| No. | Plastic Substrate |
|---|---|
| 1. | Polypropylene flat stock (41,000 flex modulus) |
| 2. | Polypropylene curved pieces (41,000 flex modulus) |
| 3. | Polypropylene flat stock (163,000 flex modulus) |
| 4. | Polypropylene curved pieces (163,000 flex modulus) |
| 5. | Polyester bulk molding compound (BMC), 10% by weight glass-filled flat stock |
| 6. | Polyester bulk molding compound (BMC), 10% by weight glass-filled curved pieces |
| 7. | Polyester bulk molding compound (BMC), 20% by weight glass-filled flat stock |
| 8. | Polyester bulk molding compound (BMC), 20% by weight glass-filled curved pieces |
| 9. | Mineral fillad nylon flat stock |
| 10. | Mineral filled nylon curved pieces |
| 11. | Polycarbonata flat stock (Lexan ® 141) |
| 12. | Polycarbonate curved pieces (Lexan ® 141) |
| 13. | Polyarylate curved pieces |
| 14. | Polyether imide flat stock (Ultem ® 1000 from the Plastics Division of General Electric Corp. |
| 15. | Polyether imide flat stock (Ultem ® 4006 from the Plastics Division of General Electric Corp. |

(c) A first set of each of the resulting cured, clear coatings is scribed in a cross-hatch pattern and tested for adhesion according to test FLTM-B1 6-1. No. 610 tape from 3M Corporation is firmly pressed across the cross-hatched area and then quickly ripped from the coating. The area beneath the cross-hatched pattern from which the tape is ripped is examined visually to determine the amount of area on the panel to which cured coating is still adhered. A rating of "Pass" means that none of the coating was removed from the substrate. The results are summarized in TABLE 3 below in the column labeled "Initial Adhesion".

A second set of each of the resulting cured, clear coatings is exposed to 120 hours of 98 plus or minus 2 percent relative humidity at 38 plus or minus 1° C. Next, the coatings are scribed in a cross-hatch pattern and tested for adhesion according to test FLTM-BI 6-1 as described immediately above. A rating of "Pass" means that none of the coating was removed from the substrate. The results are summarized in TABLE 3 below in the column labeled "120 Hrs Humidity".

A third set of each of the resulting, clear coatings is immersed for 96 hours in water at 32 plus or minus 1° C. Next, the coatings are scribed in a cross-hatch pattern and tested for adhesion according to test FLTM-Bl 6-1 as described immediately above. A rating of "Pass" means that none of the coating was removed from the substrate. The results are summarized in TABLE 3 below in the column labeled "96 Hrs Immersion".

TABLE 3

| No. | Initial Adhesion | 120 Hrs Humidity | 96 Hrs Immersion |
|---|---|---|---|
| 1. | Pass | Pass | Pass |
| 2. | Pass | Pass | Pass |
| 3. | Pass | Pass | Pass |
| 4. | Pass | Pass | Pass |
| 5. | Pass | Pass | Pass |
| 6. | Pass | Pass | Pass |
| 7. | Pass | Pass | Pass |
| 8. | Pass | Pass | Pass |
| 9. | Pass | Pass | Pass |
| 10. | Pass | Pass | Pass |
| 11. | Pass | Pass | Pass |
| 12. | Pass | Pass | Pass |
| 13. | Pass | Pass | Pass |
| 14. | Pass | Pass | Pass |
| 15. | Pass | Pass | Pass |

As can be seen from the results summarized in TABLE 3, the cured coatings exhibited excellent adhesion characteristics to a variety of plastic substrates even after exposure to a variety of potentially destructive test conditions.

EXAMPLE 2

This example illustrates the preparation of a basecoat composition of the invention and the application and curing of the basecoat on a substrate of polyester bulk molding compound (BMC) followed by vacuum metallization (evaporation) and application and curing of a topcoat composition thereover.

(a) A clear, ultraviolet light (UV) curable basecoat composition of the invention is prepared as described in part (a) of Example 1.

(b) A clear, UV curable topcoat composition is prepared by adding in order while mixing the ingredients set forth in the following TABLE 4. The resulting UV curable topcoat composition contains 40 percent by weight solids and 60 percent by weight solvents.

TABLE 4

TOPCOAT COMPOSITION

| Component | Amount (pbw) |
| --- | --- |
| n-Butyl acetate | 313.9 |
| 2-Ethoxy-4'-iso-dodecyloxalanilide concentrate[1] | 31.8 |
| Acrylic copolymer[2] | 290.4 |
| Alpha-hydroxy-alpha-dimethylphenyl ketone[3] | 6.4 |
| 2,2-Diethoxyacetophenone | 8.9 |
| Benzophenone | 9.5 |
| Nonionic fluorocarbon suractant[4] | 0.6 |
| Pentaerythritol triacrylate | 80.1 |
| 1,6-Hexanediol diacrylate | 53.4 |

[1]Available as Sanduvor ® 3206 Liquid from Sandoz Chemicals Corp.
[2]An acrylic copolymer prepared from 87.4 pbw isobornyl acrylate, 49.9 pbw methyl methacrylate, 25.0 pbw 2-ethylhexyl acrylate, 12.5 pbw dimethylaminoethyl methacrylate and 74.9 pbw butyl methacrylate at 46 percent by weight solids in a solvent mixture containing 25.0 pbw ethyl acetate and 225.0 pbw butyl acetate. The acrylic copolymer was prepared using 1 pbw 2,2'-azobismethylethylacetonitrile (VAZO 67 from E. I. DuPont de Nemours and Company) and 0.5 pbw hypophosphorous acid. The product has a Gardner-Holdt viscosity of T-U, residual contents of methyl methacrylate, 2-ethylhexyl acrylate and isobornyl acrylate determined by gas chromatography of 0.10, 0.61 and 2.1 percent by weight respectively, a number average molecular weight in the range of about 30,746-39,763, a weight average molecular weight in the range of about 75,000-82,638, and a peak molecular weight in the range of about 124,452-137,005 as determined by gel permeation chromatography utilizing a polystyrene standard.
[3]A photoinitiator available as EM1173 from EM Chemicals.
[4]Available as FC-431 from 3M Corporation.

(c)(i) At least 10 samples (Set No. 1) of curved pieces of polyester (BMC) plastic are coated with the clear, UV curable basecoat composition of part (a) and UV cured as follows. The basecoat composition is spray applied to the sample followed by a 5 minute flash at ambient temperature and a 3 minute flash at 150° F (65.6° C) and then cured by twice passing the sample at a rate of 40 ft/min beneath 4 medium pressure mercury vapor lamps each operating at 200 watts/inch at a distance of about 8 inches from the surface of the sample to provide a total exposure to the surface of the coating of about 2500-3500 millijoules/cm$^2$ per sample. The resultant cured films have a dry film thickness ranging from 0.5 to 1.5 mils.

(c)(ii) At least 10 additional samples (Set No. 2) of curved pieces of polyester (BMC) plastic are flowcoated with the UV basecoat composition of part (a), flashed for 10-15 minutes at ambient temperature, and then UV cured by rotating the sample for 90 seconds at 4 revolutions/minute at a distance of 14 inches from 2 Fusion bulbs (H bulbs) each operating at 200 watts/inch. The resultant cured films have a dry film thickness of from 1.0-2.0 mils.

(d) Following application and curing of the basecoat composition on the substrates as described in parts (c)(i) and (c)(ii) above, the cured films are vacuum metallized with aluminum using a CVM-61 Evaporation Unit from CVC Products, Inc., Rochester, N.Y. Operating conditions and materials utilized for the vacuum metallization were as follows: 99.999% pure aluminum wire of 0.062 inches in diameter (about 0.2 grams); chamber pressure of about 10$^{-4}$ torr; current for aluminum evaporation of about 15 to 20 amperes; and distance between filament and substrate of from 5 inches (13 cm) to about 16 inches (40 cm) depending on the shape of the substrate.

(e)(i) Within 1 hour following the vacuum metallization, the vacuum metallized samples (Set No. 1) from part (c)(i) are coated with the clear, UV curable topcoat composition of part (b) and UV cured as follows. The topcoat composition is spray applied to the sample followed by a 5 minute flash at ambient temperature and a 3 minute flash at 150° F (65.6° C) and then cured by twice passing the sample at a rate of 40 ft/min beneath 4 medium pressure mercury vapor lamps each operating at 200 watts/inch at a distance of about 8 inches from the surface of the sample to provide a total exposure to the surface of the coating of about 2500-3500 millijoules/cm$^2$ per sample. The resultant cured films have a dry film thickness ranging from 0.5 to 1.5 mils.

(e)(ii) Within 1 hour following the vacuum metallization, the vacuum metallized samples (Set No. 2) from part (c)(ii) are flowcoated with the UV topcoat composition, flashed for 10-15 minutes at ambient temperature, and then UV cured by rotating the sample for 90 seconds at 4 revolutions/minute at a distance of 14 inches from 2 Fusion bulbs (H bulbs) each operating at 200 watts/inch. The resultant cured films have a dry film thickness of from 1.0-2.0 mils.

(f) A first set of each of the resulting cured, composite (basecoat/metallized layer/topcoat) films (Set Nos. 1 and 2) is scribed in a cross-hatch pattern and tested for adhesion according to test FLTM-B1 6-1. No. 610 tape from 3M Corporation is firmly pressed across the cross-hatched area and then quickly ripped from the film. The area beneath the cross-hatched pattern from which the tape is ripped is examined visually to determine the amount of area on the panel to which composite film is still adhered. A rating of "Pass" means that none of the composite film is removed from the substrate and the composite film exhibits no evidence of intercoat adhesion failure. The results are summarized in TABLE 5 below in the column labeled "Initial Adhesion".

A second set of each of the resulting cured, composite films (Set Nos. 1 and 2) is exposed to 120 hours of 98 plus or minus 2 percent relative humidity at 38 plus or minus 1° C. Next, the composite films are scribed in a cross-hatch pattern and tested for adhesion according to test FLTM-B1 6-1 as described immediately above. A rating of "Pass" means that none of the composite film is removed from the substrate and the composite film exhibits no evidence of intercoat adhesion failure. The results are summarized in TABLE 5 below in the column labeled "120 Hrs Humidity".

A third set of each of the resulting, composite films (Set Nos. 1 and 2) is subjected to 5 complete cycles of the following: (1) 2 hours exposure to 98 plus or minus 2 percent relative humidity at 38 plus or minus 1° C, (2) 4 hours exposure to radiation from six, 274 watt, incandescent sunlamps at a distance of 12 inches from the composite film in a chamber maintained at 145 plus or minus 2° F, (3) 2 hours at minus 20 plus or minus 2° F, and (4) 16 hours exposure to radiation as described in (2) immediately above. Next the composite films are scribed in a cross-hatch pattern and tested for adhesion according to test FLTM-B1 6-1 as described immediately above. A rating of "Pass" means that none of the composite film is removed from the substrate and the composite film exhibits no evidence of intercoat adhesion failure. The results are summarized in TABLE 5 below in the column labeled "Cycle Test".

TABLE 5

| Set No. | Initial Adhesion | 120 Hrs Humidity | Cycle Test |
| --- | --- | --- | --- |
| 1. | Pass | Pass | Pass |
| 2. | Pass | Pass | Pass |

As can be seen from the results summarized in TABLE 5, the cured composite films exhibit excellent adhesion characteristics over the polyester (BMC) plastic even after exposure to a variety of potentially destructive testing conditions.

What is claimed is:

1. A plastic substrate having directly adhered to a surface thereof, a crosslinked film from a coating composition containing:

(A) from 1 to 5 percent of a saturated, chlorinated polymeric material selected from the group consisting of (1) a chlorinated polyolefin containing about 5 to 75 percent by weight of chlorine and having a number average molecular weight of about 5,000–50,000, (2) a chlorinated polyolefin containing carboxylic anhydride groups and about 5 to 25 percent by weight of chlorine and having a number average molecular weight of about 5,000–50,000, and (3) a mixture thereof; (B) from 20 to 80 percent of a radiation sensitive monomer having at least two addition polymerizable unsaturated bonds; (C) from 0.1 to 5.0 percent of a photopolymerization initiator; and (D) from 80 to 20 percent of an acrylic addition polymer having at least one amino group and having a number average molecular weight of about 8,000–70,000, said addition polymer being derived from a mixture of copolymerizable ethylenically unsaturated monomers containing a monomeric ethylenically unsaturated amine;

wherein said percentages of (A), (B), (C) and (D) are by weight based on nonvolatile components of said coating composition.

2. The plastic substrate of claim 1 wherein said radiation sensitive monomer having at least two addition polymerizable unsaturated bonds comprises a (meth)acrylic ester of an organic polyol.

3. The plastic substrate of claim 2 wherein said (meth)acrylic ester comprises pentaerythritol triacrylate and hexanediol diacrylate.

4. The plastic substrate of claim 1 wherein the amount of monomeric ethylenically unsaturated amine in said mixture of copolymerizable ethylenically unsaturated monomers ranges from 1 to 25 percent by weight based on the total weight of monomers employed in the mixture.

5. The plastic substrate of claim 4 wherein said monomeric ethylenically unsaturated amine is selected from the group consisting of an acrylate-functional amine, a methacrylate-functional amine and a mixture thereof.

6. The plastic substrate of claim 1 having directly overlying said crosslinked film an adherent, thin layer of metal.

7. The plastic substrate of claim 6 having directly overlying said thin layer of metal an adherent clear, film from a topcoating composition crosslinked by exposure to ultraviolet radiation.

* * * * *